United States Patent [19]
Scherenberg

[11] 3,877,222
[45] Apr. 15, 1975

[54] METHOD FOR THE OPERATION OF AN INTERNAL COMBUSTION ENGINE WITH AFTERBURNER CHAMBER AND INSTALLATION FOR CARRYING OUT THE METHOD

[75] Inventor: Hans O. Scherenberg, Stuttgart, Germany

[73] Assignee: Daimler-Benz Aktiengesellschaft, Stuttgart-Unterturkheim, Germany

[22] Filed: Nov. 10, 1972

[21] Appl. No.: 305,315

Related U.S. Application Data
[63] Continuation-in-part of Ser. No. 81,865, Oct. 19, 1970, abandoned.

[30] Foreign Application Priority Data
Oct. 17, 1969   Germany............................ 1952268

[52] U.S. Cl. ....................... 60/274; 60/282; 60/307; 123/90.15
[51] Int. Cl. ........................... F02b 75/10; F01l 1/34
[58] Field of Search...................... 60/274, 307, 282; 123/90.15, 90.16, 90.17, 90.18, 107, 113, 116

[56] References Cited
UNITED STATES PATENTS

| | | | |
|---|---|---|---|
| 2,305,787 | 12/1942 | Kales | 123/90.15 |
| 2,770,224 | 11/1956 | Ericson | 123/90.15 |
| 2,851,851 | 9/1958 | Smith | 123/90.15 |
| 2,861,557 | 11/1958 | Stolte | 123/90.15 |
| 2,872,910 | 2/1959 | Catha | 123/90.15 |
| 3,106,821 | 10/1963 | Ridgway | 60/307 |
| 3,262,435 | 7/1966 | Cribbs | 123/90.15 |
| 3,441,009 | 4/1969 | Rafanelli | 123/90.15 |
| 3,481,314 | 12/1969 | LeCrenn | 123/90.18 |
| 3,494,336 | 2/1970 | Myers | 123/75 |

*Primary Examiner*—Douglas Hart
*Attorney, Agent, or Firm*—Craig & Antonelli

[57] ABSTRACT

A method and apparatus for operating a four-cycle internal combustion engine, used for driving a vehicle, in which the beginning of the opening of the exhaust valve is advanced, from a middle rotational or load range of the engine, with a decreasing rotational speed and/or decreasing load of the engine.

14 Claims, 6 Drawing Figures

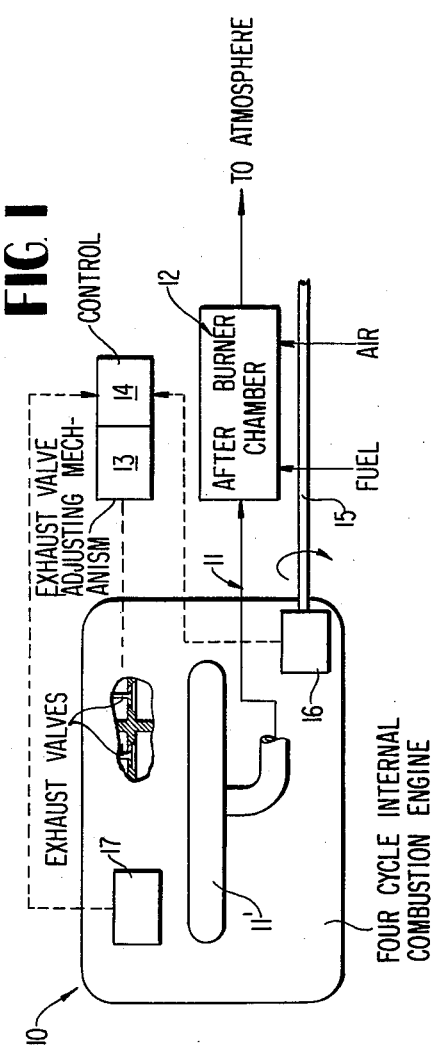
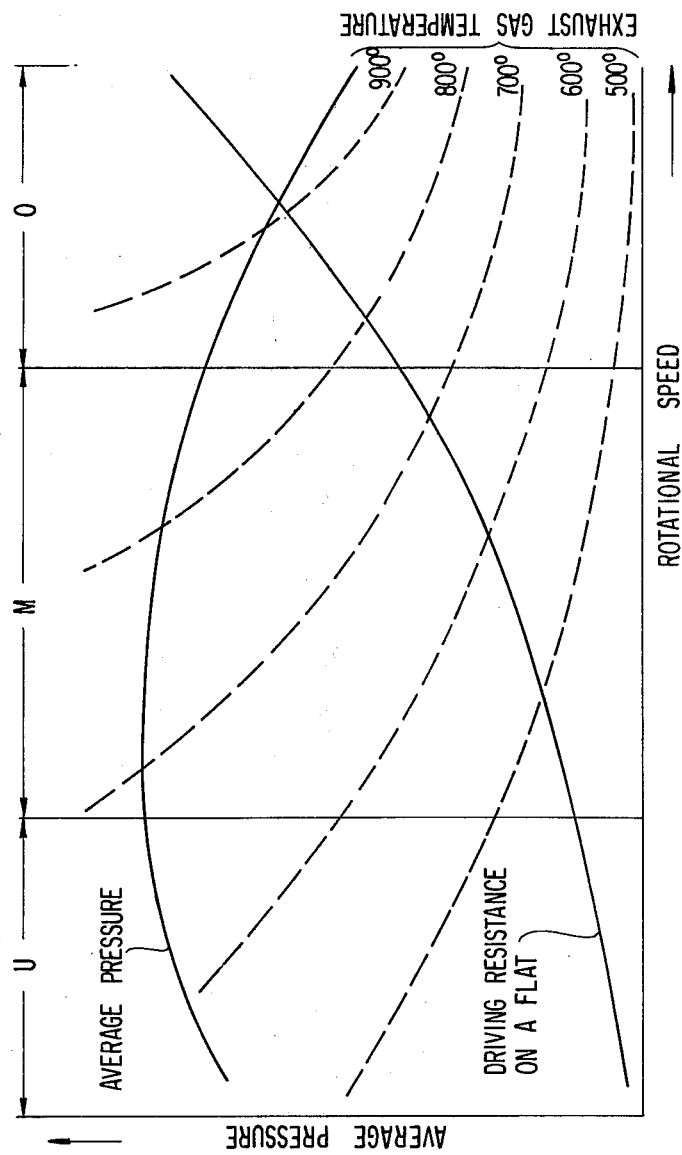

METHOD FOR THE OPERATION OF AN INTERNAL COMBUSTION ENGINE WITH AFTERBURNER CHAMBER AND INSTALLATION FOR CARRYING OUT THE METHOD

This application is a Continuation-in-Part of my co-pending application, Ser. No. 81,865, filed on Oct. 19, 1970 now abandoned.

BACKGROUND AND SUMMARY OF THE INVENTION

The present invention relates to a method for the operation of a four-cycle internal combustion engine, serving in particular as a driving engine of a vehicle, equipped with an after-burner chamber connected to the exhaust system. Furthermore, the present invention relates to an installation for carrying out this method.

It is noted that internal combustioin engines used in connection with the drive of vehicles are equipped with afterburner chambers in order to combust uncombusted components still present in the exhaust gases which leave the engine, so that the exhaust gases finally leaving the afterburner chamber are free of poisonous components. The afterburner chamber requires thereby a predetermined minimum temperature for the fulfillment of its task. However, this predetermined minimum required temperature is not always present in the afterburner chamber under all operating conditions of the internal combustion engine. This predetermined required minimum temperature is particularly not available when the internal combustion engine is operated in idling or in the lower partial load range, during which conditions the exhaust gases leaving the engine are in many cases insufficiently heated to maintain proper combustion in the afterburner chamber.

The present invention is concerned with the task of assuring that the afterburner chamber remains completely capable of proper functioning over all of the rotational speeds and load ranges of the engine. The underlying problems are solved according to the present invention by providing that, beginning from a middle rotational speed or load-range, the beginning of the opening of the exhaust valves is advanced or shifted to an earlier instant in relation to the top dead center position of the corresponding piston in the internal combustion engine with a decreasing rotational speed and-/or with a decreasing load. Preferred embodiments of the present invention relate to exhaust valve opening control on engines of otherwise conventional fixed cylinder head and cylinder block construction with combustion chambers formed therebetween and with exhaust valves controlling openings in a part of the fixed cylinder head-block construction leading to the combustion chambers.

It is achieved by the present invention in a relatively simple manner and without significant impairment of the efficiency of the internal combustion engine that, within the rotational speed-and load-ranges of the internal combustion engine, in which the exhaust gases would not normally be sufficiently hot to keep the afterburner chamber in operation, exhaust gases with a sufficiently high temperature are fed to the afterburner chamber. That is, the advance in the initial opening of the exhaust valves results in the exhausting of higher temperature exhaust gases than would be the case under normal operation of the exhaust valves.

According to a further feature of the present invention, for purposes of achieving a favorable gas exchange process and an increased efficiency, beginning from a middle rotational speed-or load-range, the beginning of the opening of the exhaust valve may also be advanced or shifted to an earlier instant with an increasing rotational speed and/or increasing load.

For the advance of the beginning of the opening of the exhaust valves, a conventional adjusting control mechanism may be provided, control mechanisms that could be utilized with the present invention being known as such in the prior art. The actuating mechanism of the adjusting control mechanism may be constructed controllable by devices detecting the load of the internal combustion engine, such as, for example, by installations detecting the position of the throttle valve in the suction pipe or by installations detecting the position of the control rack in the injection pump, and/or by installations detecting the rotational speed of the internal combustion engine, for example by centrifugal governor of conventional construction. A preferred embodiment in accordance with the present invention utilizes an adjusting mechanism arranged directly in the drive train of a camshaft which controls the exhaust valve openings, which adjusting mechanism is responsive to the speed of an output shaft operatively driving the camshaft.

Accordingly, it is an object of the present invention to provide a method and apparatus for the operation of an internal combustion engine with an afterburner chamber which avoids by simple means the aforementioned shortcomings and drawbacks encountered in the prior art.

Another object of the present invention resides in a method and apparatus for operating an internal combustion engine with afterburner chamber which assures proper operation of the afterburner chamber to combust the non-combusted gases under all operating conditions of the engine.

A further object of the present invention resides in an internal combustion engine used for driving a motor vehicle and equipped with an afterburner chamber whose proper operation is ensured by simple means substantially not affecting the efficiency of the internal combustion engine.

Still another object of the present invention resides in a method and apparatus of the type described above which not only achieves the aforementioned aims and objects by simple means but additionally improves the gas exchange cycle of the engine.

These and further objects, features and advantages of the present invention will become more obvious from the following description when taken in connection with the accompanying drawing which shows, for purposes of illustration only, several embodiments in accordance with the present invention.

BRIEF DESCRIPTION OF THE DRAWINGS

FIG. 1 is a schematic view of an internal combustion engine equipped with an afterburner chamber and a control system in accordance with the present invention;

FIG. 2 is a diagram explanatory of the present invention and indicating average pressure plotted against the rotational speed of the engine;

DETAILED DESCRIPTION OF THE DRAWINGS

Figure 3:
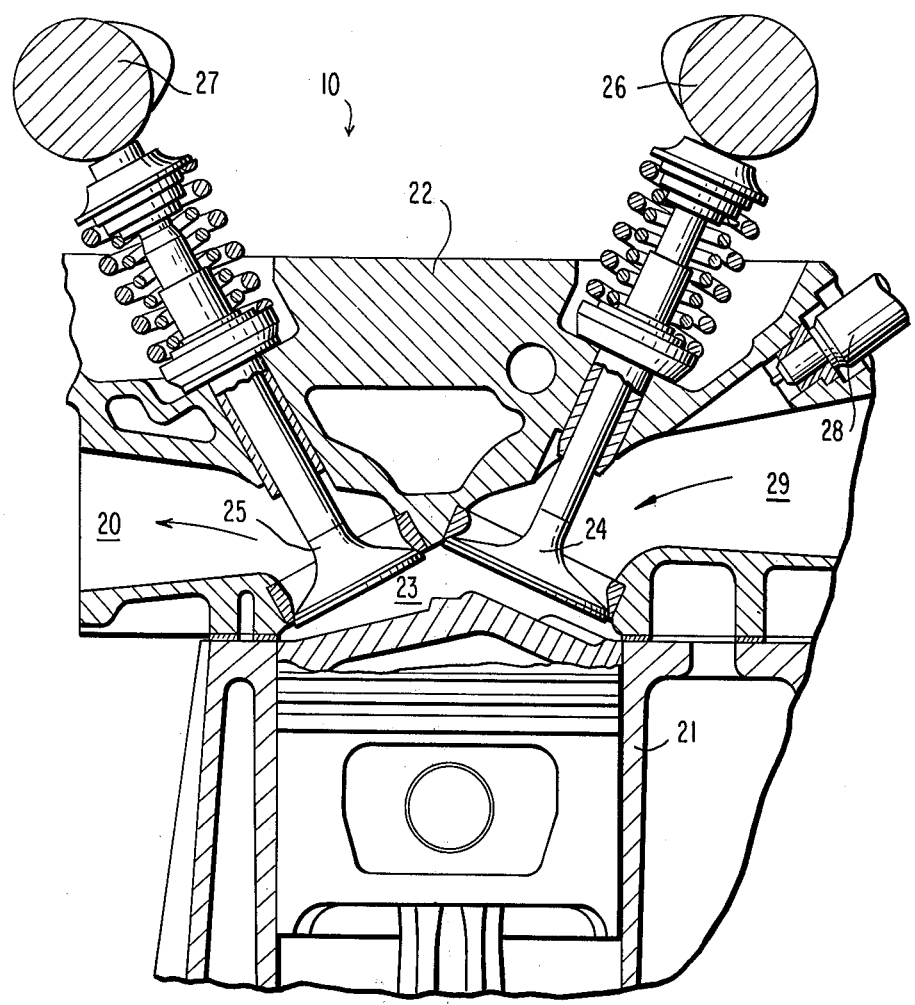
FIG. 3 is a cross-sectional schematic view through a cylinder and cylinder head portion of an engine having an exhaust valve control system in accordance with the present invention.

Referring now to the drawings, and more particularly to FIG. 1, reference numeral 10 (see FIG. 3 and associated description for details of the engine 10) generally designated therein a conventional internal combustion engine and more specifically a four-cycle internal combustion engines used for driving a motor vehicle. The engine 10 is provided with an exhaust gas system generally designated by reference numeral 11, which includes the usual exhaust manifold 11' connected by way of exhaust channels with the exhaust valves. A conventional afterburner chamber generally designated by reference numeral 12 is included in the exhaust gas system 11 to which fuel and possibly fresh air may be supplied to enhance its operation.

The beginning of the opening of the exhaust valves is controlled by means of an exhaust valve adjusting mechanism 13 of conventional construction which advances or retards the opening instant of the exhaust valves as determined by a conventional control mechanism 14. The control mechanism 14 is supplied for that purpose with information concerning the rotational speed of the engine obtained, for example, from a centrifugal governor 16 driven by the crankshaft or engine output shaft 15 and with information concerning the engine load obtained from an engine load detecting device 17, for example, connected with the throttle valve in the intake pipe of the engine and detecting its position or connected with the control rack of an injection pump and detecting its position. The information picked-up by the devices 16 and 17 is fed in a conventional manner to the control device 14 which converts the same by conventional means to provide the desired control effects for the advance of the opening of the exhaust valves in accordance with the present invention, as will be explained more fully hereinafter by reference to FIG. 2.

Referring now to FIG. 2, this figure illustrates a diagram in which the average pressure is plotted against the rotational speed of the four-cycle internal combustion engine 10 which serves as driving engine of a vehicle and is equipped with the afterburner chamber 12, in which the exhaust gases are combusted with the admixture of fuel and possibly fresh air. Furthermore, FIG. 2 illustrates a curve of the driving resistance on a flat surface and curves with equal exhaust temperatures which result if the adjusting mechanism 13 of the internal combustion engine is not actuated. In order to achieve that the afterburner chamber 12 coordinated to the internal combustion engine 10 remains functionally capable for the completely combustion of poisonous components in the exhaust gas with the admixture of fuel and possibly fresh air also when the internal combustion engine 10 is operated in idling condition, at lower rotational speeds and at partial load, i.e., when the exhaust gases from the internal combustion engine as such are not sufficiently hot in order to maintain the operation of the afterburner chamber 12, the adjustment control 13 for the exhaust valves of the internal combustion engine 10 is so adjusted in a middle rotational speed-and load-range M that the internal combustion engine achieves a high output with favorable consumption values, and is so adjusted beginning from this range M with a decreasing rotational speed and a decreasing load in a lower range U that the opening of the exhaust valves begins earlier. As a result of the advanced opening of the exhaust valves, exhaust gases leave the internal combustion engine which are sufficiently hot in order to maintain the operation of the afterburner chamber 12.

The adjusting control mechanism for the exhaust valves is also utilized to advance the begining of the opening of the exhaust valves in the upper rotational speed-and load-range O in order to enable a favorable gas exchange operation in this operating condition of the internal combustion engine.

FIG. 3 is a cross-sectional view through the upper portion of a cylinder 21 and a cylinder head 22 of a four-cycle engine of the type contemplated for use with the present invention. The cylinder 21 and cylinder head 22 are fixedly connected to one another. The combustion chamber 23 in the cylinder head 22 is essentially of a hemispherical shape. For each cylinder, an inlet valve 24 and an outlet valve 25 is arranged in a V-configuration with respect to one another. A camshaft 26 is provided for controlling all of the inlet valves 24 of one cylinder row. A camshaft 27 is provided for controlling all outlet or exhaust valves 25 of one cylinder row. Fuel is electronically controlled and injected to the intake duct 29 by means of an injection valve 28.

As discussed above with respect to FIG. 1, the exhaust valves are opened, in the lower speed range of the internal combustion engine, at an earlier instant as compared with their usual opening time. In this manner, the exhaust gases exiting from the outlet duct 20 are at a higher temperature for accommodating the afterburner chamber operation.

As mentioned above, the rotational speed of the internal combustion engine may be detected in a simple manner by any conventional means, such as a conventional centrifugal governor, although any other suitable device can be used. It suffices for detecting the prevailing engine load to ascertain the displacement of the throttle valve linkage, or in case of an injection internal combustion engine, the displacement of the control rack in the fuel injection pump. It is also contemplated that the arrangement may also be made in such a manner that the rotational speed and load are superimposed one upon the other in the control device 14 in order to obtain the desired characteristics indicated in FIG. 2 or such other characteristics as may be desired.

Figure 5:
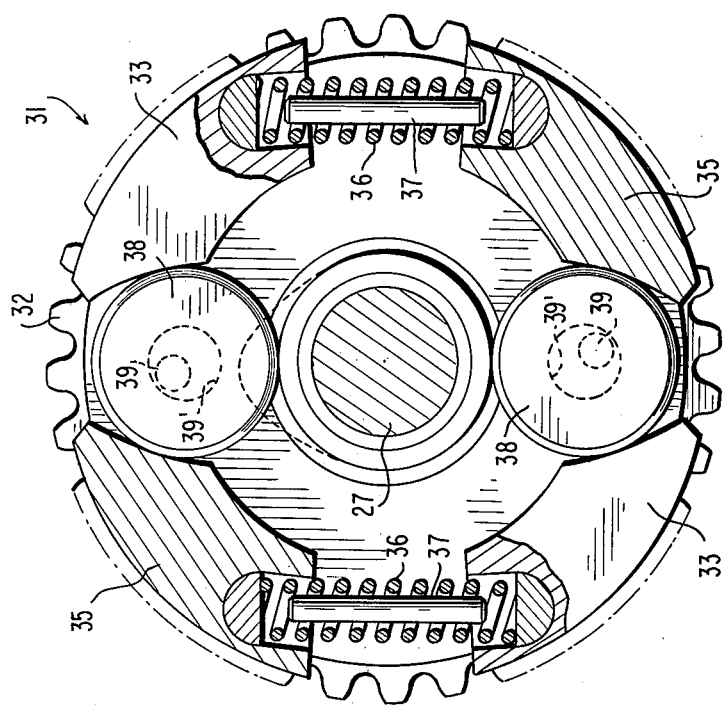
FIG. 5 is a schematic cross-sectional view taken in the direction of arrows V—V in FIG. 4.
Figure 4:
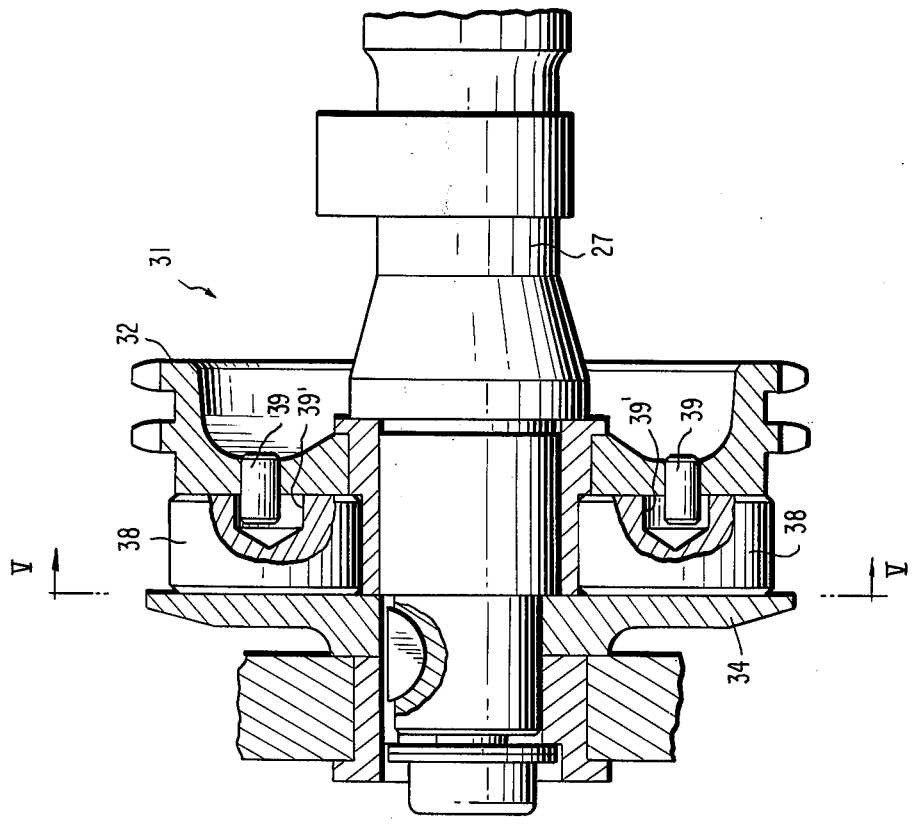
FIG. 4 is a partial cross-sectional side view of a preferred embodiment of an adjusting mechanism for varying the exhaust valve opening in accordance with the present invention.

A preferred embodiment in accordance with the present invention for adjusting the opening of the exhaust valves is illustrated in FIGS. 4 and 5. An adjusting mechanism 31 is mounted at the driven end of the camshaft 27. The adjusting mechanism 31 includes a sprocket wheel or gear 32 rotatably disposed on the camshaft 27 and driven by the crankshaft of the internal combustion engine. Adjusting segments 33 are firmly joined to the sprocket wheel 32. The adjusting mechanism also includes a flange 34 fixedly connected with the camshaft 27 for rotation therewith. This flange 34 is provided with setting segments 35. Compression springs 36 with guide pins 37, on the one hand, and cylindrical fly weights 38, on the other hand, are arranged between the setting and adjusting segments 35 and 33. Pins 39, connected to the sprocket wheel or gear 32, engage the fly weights 38 to limit the radial movement of the fly weights. The openings 39' in the fly weights are larger than the pins to accommodate a limited radial movement of the fly weights during operation of the mechanism.

The arrangement of the above-described adjusting mechanism 31 is such that, in the starting position, the relative position of the flange 34 and the gear 32 effects an earlier initial opening of the exhaust valves than the normal initial opening desired for middle range engine operation. With an increasing speed of the engine, the fly weights 38 spread the setting segments 33 and 35 apart, such that the angular position of the flange 34 with respect to the sprocket wheel 32 is varied to cause a later initial opening of the exhaust valves.

The basic operation of the adjusting mechanism 31 can be varied by changing the spring bias for the spring 36 by changing the position of the pins 39. In this manner, it is relatively simple to design the optimum control characteristics for a given engine.

Figure 6:
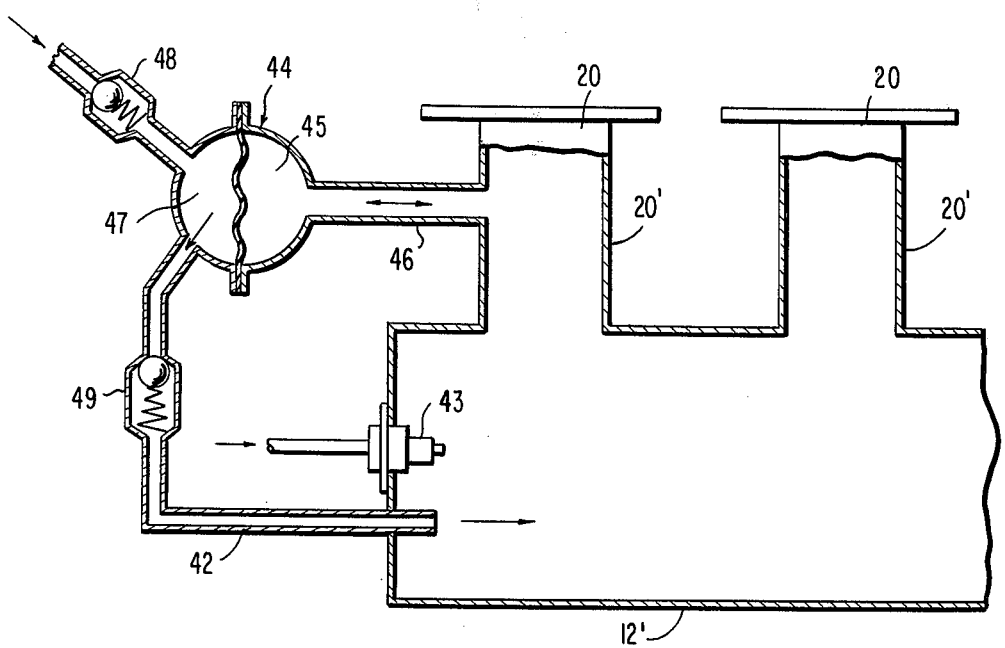
FIG. 6 is a schematic enlarged view of portions of the afterburner and exhaust gas system in accordance with the present invention.

FIG. 6 is an enlarged view showing a specific arrangement of an afterburner chamber which could be connected to outlet ducts 20 (FIG. 3). The exhaust gas manifold 12' is fashioned as an afterburner chamber. The exhaust gases exiting from the outlet ducts 20 pass through the connecting pipes 20' to the exhaust gas manifold afterburner chamber 12' and are there subjected to an afterburning step while admixing fresh air entering through conduit 42 and adding fuel injected by nozzle 43. The fresh air is conveyed by a diaphragm pump 44, one chamber of which, denoted by 45, is in communication via a conduit 46 with the pulsating exhaust gas stream in a connecting pipe 20'. A check valve 48 is provided at the other chamber 47, which valve 48 opens in the direction toward this chamber to permit entry of fresh air. Also, a check valve 49 is arranged downstream of this chamber 47 to block reverse flow from the exhaust gas manifold 12'. The pulsating movement of the diaphragm and the diaphragm pump 44 causes fresh air to be taken in and pumped into the exhaust gas manifold 12'.

While I have shown and described only several embodiments in accordance with the present invention, it is understood that the same is not limited thereto but is susceptible of numerous changes and modifications as known to those skilled in the art and I therefore do not wish to be limited to the details shown and described herein, but intend to cover all such changes and modifications as are encompassed by the scope of the appended claims.

I claim:

1. In a method for operating an internal combustion engine of the type having an afterburner combustion chamber arranged in the engine exhaust system downstream of exhaust valves associated with the main engine combustion chambers, said main engine combustion chambers being arranged between a relatively fixed cylinder head and cylinder block adjacent upper portions of cylinders of said cylinder block, said exhaust valves being movable to selectively close and open openings in a fixed part of said cylinder head; the improvement comprising: advancing the initial opening of the exhaust valves when the engine is in a middle rotational speed-or-load-range in response to a decrease in at least one of two control magnitudes consisting of engine rotational speed and engine load and advancing the initial opening of the exhaust valves in response to an increase in at least one of the two control magnitudes consisting of rotational speed and engine load.

2. A method according to claim 1, characterized in that the advance of the initial opening of the exhaust valves takes place in dependence on both control magnitudes.

3. A method according to claim 1, characterized in that the advance of the initial opening of the exhaust valves takes place in dependence on both control magnitudes.

4. A method according to claim 1, wherein the advance of the initial opening of the exhaust valves takes place in dependence on the engine rotational speed.

5. An installation for controlling the operation of a four-cycle internal combustion engine of the type having an afterburner combustion chamber in the engine exhaust system downstream of exhaust valves associated with the main engine combustion chambers, said main engine combustion chambers being arranged between a relatively fixed cylinder head and cylinder block adjacent upper portions of cylinders in said cylinder block, said exhaust valves being movable to selectively close and open openings in a fixed part of said cylinder block and head construction; said installation comprising: an exhaust system controlled by exhaust valve means, an afterburner chamber means arranged downstream of the exhaust valve means, valve adjusting means operatively connected with said exhaust valve means for adjusting the beginning of the opening of the exhaust valve means, and control means for actuating said adjusting means, said control means being operable from a middle speed-and-load-range of the engine to advance the initial opening of the exhaust valve means in response to a decrease of at least one of the two control magnitudes consisting of engine load and engine rotational speed, wherein said control means is also operable, from a middle speed-or-load range of the engine, to advance the initial opening of the exhaust valve means with an increase in at least one of the two control magnitudes consisting of rotational speed and load of the engine.

6. An apparatus according to claim 5, wherein the control means includes means for detecting the load of the internal combustion engine.

7. An installation according to claim 6, wherein said detecting means includes means for detecting the position of a throttle valve in a suction pipe of the engine.

8. An installation according to claim 6, wherein said detecting means includes means for detecting the position of a control rack in an injection pump of the engine.

9. An installation according to claim 6, wherein said control means includes centrifugal governor means for detecting the rotational speed of the engine.

10. An installation according to claim 5, wherein said control means is operable in dependence on both the load and rotational speed of the internal combustion engine.

11. An arrangement according to claim 5, wherein a diaphragm pump, operable in response to pulsating exhaust gas flow from said engine, is provided for pumping fresh air into said afterburner chamber.

12. An installation according to claim 11, wherein check valve means are provided upstream and downstream of said pump.

13. An installation for controlling the operation of a four-cycle internal combustion engine of the type having an afterburner combustion chamber in the engine exhaust system downstream of exhaust valves associated with the main engine combustion chambers, said main engine combustion chambers being arranged between a relatively fixed cylinder head and cylinder block adjacent upper portions of cylinders in said cylinder block, said exhaust valves being movable to selectively close and open openings in a fixed part of said cylinder block and head construction; said installation comprising: an exhaust system controlled by exhaust valve means, an afterburner chamber means arranged downstream of the exhaust valve means, valve adjusting means operatively connected with said exhaust valve means for adjusting the beginning of the opening of the exhaust valve means, and control means for actuating said adjusting means, said control means being operable from a middle speed and-load-range of the engine to advance the initial opening of the exhaust valve means in response to a decrease of at least one of the two control magnitudes consisting of engine load and engine rotational speed, wherein the control means is operable in dependence on the rotational speed of the internal combustion engine, wherein said control means comprises an adjusting mechanism operatively inserted between an exhaust valve controlling camshaft and an engine output shaft for varying the relative rate of rotation of said camshaft and output shaft in dependence on the speed of rotation of said output shaft, wherein said adjusting mechanism includes: a camshaft gear rotatably mounted on said camshaft, said gear being drivingly connected to said engine output shaft such that said gear rotates at a fixed relative speed with respect to the speed of said output shaft, a flange fixedly attached to said camshaft, and interconnecting means positioned between said flange and said gear for varying the relative position of said gear and said camshaft in dependence on the rotational speed of said gear, and wherein said interconnecting means includes axially extending pins fixed to said gear, adjusting segments fixed to said gear, setting segments on said flange, spring means between said setting and adjusting segments, and fly weights between said setting and adjusting segments, said fly weights being mounted for radial movement with respect to said gear axis for directly controlling the relative position of said setting and adjusting segments with respect to one another, said pins engaging said fly weights to limit their radial movement.

14. An arrangement according to claim 13, wherein, with a slowly moving gear, said spring means and pins are positioned such that an earlier initial opening of said exhaust valves is effected by said camshaft than is the case for normal middle range operation of the engine, whereby, with an increasing speed of the engine, the setting and adjusting segments are spread apart by the fly weights to cause later initial opening of said exhaust valves.

* * * * *